US006535873B1

(12) United States Patent
Fagan et al.

(10) Patent No.: US 6,535,873 B1
(45) Date of Patent: Mar. 18, 2003

(54) SYSTEM AND METHOD FOR INDEXING ELECTRONIC TEXT

(75) Inventors: Lawrence Fagan, Los altos, CA (US); Daniel Berrios, San Francisco, CA (US); Jonathan Dugan, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/558,411

(22) Filed: Apr. 24, 2000

(51) Int. Cl.[7] .......................... G06F 17/30; G06F 17/00
(52) U.S. Cl. ............................. 707/3; 707/102; 707/103
(58) Field of Search ................ 707/1–7, 10, 100–103, 707/200, 203, 500–563, 511–515, 516, 526–527, 529–532; 709/200–203, 332

(56) References Cited

U.S. PATENT DOCUMENTS

| | | | |
|---|---|---|---|
| 5,309,359 A | 5/1994 | Katz et al. | |
| 5,404,295 A | 4/1995 | Katz et al. | |
| 5,404,506 A | 4/1995 | Fujisawa et al. | |
| 5,418,948 A | 5/1995 | Turtle | |
| 5,737,739 A | 4/1998 | Shirley et al. | 707/512 |
| 5,787,234 A | 7/1998 | Molloy | |
| 5,799,268 A | 8/1998 | Boguraev | 704/9 |
| 5,873,056 A | 2/1999 | Liddy et al. | |
| 5,918,232 A * | 6/1999 | Pouschine et al. | 707/103 |
| 5,940,821 A | 8/1999 | Wical | 707/3 |
| 5,963,940 A | 10/1999 | Liddy et al. | 707/5 |

OTHER PUBLICATIONS

Kim et al., MYCIN II: Design and Implementation of a Therapy Reference with Complex Content–Based Indexingk, Stanford Medical Informatics, SMI–98–0752, Oct. 1998.*

Jonathan M. Dugan et al., *Automation and Integration of Components for Generalized Semantic Markup of Electronic Medical Texts*, Stanford Medical Informatics. AMIA'99, Annual Symposium, Nov. 6–10, 1999, Marriott Wardman Park Hotel, Washington DC.
Dugan et al., *Automation and Integration of Components for Generalized Semantic Markup of Electronic Medical Texts*, Stanford Medical Informatics, SMI–1999–0792, Apr. 1999.
Berrios et al., *Knowledge Requirements for Automated Inference of Medical Textbook Markup*, Stanford Medical Informatics, SMI–1999–0802, Jun. 1999.
Kim et al., *MYCIN II: Design and Implementation of a Therapy Reference with Complex Content–Based Indexing*, Stanford Medical Informatics, SMI–98–0752, Oct. 1998.
Shortliffe et al., *The Infectious Diseases Physician and the Internet*, Stanford Medical Informatics, SMI–1999–0769, Feb. 1999.
Frisse, Mark E., *Searching for Information in a Hypertext Medical Handbook*, Commun. ACM 31.7 (Jul. 1988), pp. 881–886.

* cited by examiner

*Primary Examiner*—Alford W. Kindred
(74) *Attorney, Agent, or Firm*—Lumen Intellectual Property Services, Inc.

(57) ABSTRACT

System and method for integrating electronic text indexing and search. A concept model defines a set of concept-value pairs. A set of queries is constructed in the query model in terms of a subset of the concept-value pairs, which is used to create allowable concept-values in an inventive markup tool for assignment, via markup tags, to sentences of a piece of electronic text. Concepts are automatically updated as the query model is updated to keep the concept-values used in the markup tool consistent with the concept-values used in the query model. The queries and the assigned markup tags integrate concept-values from the concept model. The integration of the concept model with the markup tool and the query model tool makes indexing electronic textbooks much quicker with less effort.

37 Claims, 7 Drawing Sheets

"What *antimicrobial agent[s]* can be used in [Treatment ▼] of [ANY organism ▼]?"

- Restrict answers according to the following:

○ Efficacy of therapy:

⦿ *Best or first-line*

○ Alternative therapy

○ Not Recommended or Contraindicated

○ Find *combination* therapy only: ☐

○ Type/location of infection: [<UNRESTRICTED> ▼]

○ Underlying disease: [<UNRESTRICTED> ▼]

○ Other special conditions: [<UNRESTRICTED> ▼]

[Find Antimicrobial]

Antimicrobial Therapy:
General:
Drug of Choice

- See excerpt: *Several cephalosporins such as cefotaxime and cefoxitin are also effective. ...*
- Perform a [guided Medline] query based on this hit.

Hit #3
Chapter Eikenella Corrodens:
Antimicrobial Therapy:
General:
Drug of Choice

- See excerpt: *and trimethoprim-sulfamethoxa should be considered for patients with an allergic reaction to penicillin. ...*
- Perform a [guided Medline] query based on this hit.

--- contraindicated in children and pregnant women) *and trimethoprim-sulfamethoxazole should be considered for patients with an allergic reaction to penicillin.*

There is no clear evidence to suggest that combination therapy with different antibiotics affords any enhanced clinical efficacy over monotherapy. Some patients with infective endocarditis have received combination therapy with a beta-lactam antibiotic and an aminoglycoside. However, *E. corrodens* is frequently resistant to aminoglycosides, therefore casting some doubt as to whether combination therapy is necessary in the absence of studies of synergistic interaction between these antibiotics. It must also be noted that these organisms are notoriously resistant to both clindamycin and metronidazole, two agents that frequently are given as empirical therapy for presumed mixed aerobic/anaerobic infections.

B. Specific infections

Bite wounds. Human bite wounds, especially clenched fist injuries, are one of the more common infections due to *E. corrodens*. The bite wounds to the hand is particularly troublesome as it is often insidious, and may result in loss of function and permanent limitation of the range of motion of a "knuckle", osteomyelitis, septic arthritis and other serious complications. This is partly due to the failure of the clinicians to identify *E. corrodens* from the infection sites. One study of 21 patients with hand infections due to *E. corrodens*, it was noted that

FIG. 7

SYSTEM AND METHOD FOR INDEXING ELECTRONIC TEXT

STATEMENT REGARDING FEDERALLY SPONSORED RESEARCH OR DEVELOPMENT

This invention was supported in part by Health Services Research and Development Service, Department of Veterans Affairs, SBIR #5N44-C061025-001 (subcontract from Lexical Technology, Inc.) and National Library of Medicine Training Grant, LM-07033. The Government has certain rights in the invention.

FIELD OF THE INVENTION

This invention relates generally to electronic text and more particularly to searching and indexing of electronic text.

BACKGROUND ART

Current technologies in digital media storage have allowed text to be stored in electronic format on a magnetic medium or an optical medium such as compact disks. Storing text in electronic format has many advantages including space savings and near effortless mass distribution if required. Perhaps the biggest advantage is the ability to quickly search through the electronic text to retrieve the desired information. Two important factors about text searches are the speed and accuracy of the search. With increasing computing power, speed is becoming less of a concern. However, accuracy is an area where significant improvements can still be made. Search accuracy is the ability to search and locate relevant information on the subject of interest. Several criteria have been used to describe search accuracy. Search precision is the fraction of relevant search results returned to all results and search recall (also known as sensitivity) is the fraction of relevant search result returned to all possible relevant results. Therefore, one goal of a search is to increase the search precision without severely reducing the search recall.

The Internet is a gigantic set of databases linked together by a decentralized network. Because of this gigantic array of databases, there is a vast amount of data, or information, that can be searched for relevant information for a subject of interest. However, as the amount of data increases, the search accuracy decreases as there is more extraneous data.

Typical search engines such as Lycos and Infoseek on the Internet use keyword search methods. Keyword search methods involve parsing a document in a database through a search engine and selecting documents or sections that contains the keyword(s). With keyword searches, the search accuracy is usually very low. The keyword search returns many irrelevant results even though the results may contain the keywords. This low accuracy is caused by words having different meaning when in different context and also by search words being in close proximity but not being used together semantically in the text. Even when searching with multiple search keywords using boolean expressions do not yield in significant increases in accuracies. This lack of accuracy may be acceptable in the Internet environment where a user may have ample time to sieve through the irrelevant results. However, mission-critical users in other environments may not be as tolerant as time is of the essence in obtaining the relevant information.

Health-care professionals in clinical environments need precise and timely information if they are to provide optimal patient care. It has been shown that tertiary references such as textbooks or edited reviews, could meet the majority of these information needs. However, precise and timely extraction of information from these tertiary sources calls for the development of a system to efficiently search and index these tertiary sources.

Researches have developed a variety of systems to improve the indexing and searching of medical text sources with the primary goal to increase the search precision without severely reducing recall. For example, in an article titled "MYCIN II: design and implementation of a therapy reference with complex content-based indexing" Proc Amia Symp 1998: 175–179, Kim and associates built MYCIN II, a prototype information retrieval (IR) system capable of searching content-based markup in an electronic textbook on infectious disease. Users select from a pre-determined set of query templates (the query model) a query that is passed to a search engine for processing.

In an article titled "Automated Text Markup for Information Retrieval from an Electronic Textbook of infectious Disease" Proc Amia Symp 1998:975, Berrios and colleagues developed a markup tool that provided the HTML indexing required for the MYCIN II search engine. Because the tools in this system were developed independently with minimal integration, a significant amount of repeated work by the domain expert is required to generate the ontology of concepts in the concept model used by a domain expert during the markup process and the set of questions for the search engine in the query model.

A need therefore exists for a method and a highly integrated system to search and index electronic text for precise information retrieval.

OBJECTS AND ADVANTAGES

Accordingly, it is a primary object of the present invention to provide a method and a highly integrated system that will significantly increase the search precision while reducing the time necessary to prepare a file of electronic text for searching.

SUMMARY

The primary object of the present invention to provide a method and a highly integrated system that will significantly increase the search precision while reducing the time necessary to prepare a file of electronic text for searching.

Accordingly, the present invention consists of an electronic text indexing and search system comprising a concept model, a markup tool, a query model, a query interface, and a search engine.

The concept model defines a set of concept-value pairs. The concept model is modified by a concept model tool and new concept-values can also be added by a query model tool.

The query model defines a set of queries for submission to the search engine in terms of a first subset of concept-value pairs in the concept model. Each query in the query model is a template for a number of possible queries that are defined when a user uses concept-values from a menu.

The markup tool uses the first subset of concept-values used in the query model to create a set of allowable concept-values for assignment. The domain expert assigns the allowable set of concept-value pairs to the text. The markup tool also has the ability to suggest assignment of query and markup tags to the domain expert for marking up the electronic text.

The user query interface is generated automatically by using the query model. The user query interface allows the user to formulate a query to submit to the search engine.

The search engine tries to match the concept-value submitted by the query to the subset assigned by the markup tool. If there are any matches, the search engine will display a results page that displays an excerpt from the text that is found and also gives the user an option to output the query to an external database.

The user query interface can be a computer program that calls a function that selects the concept-values to be submitted to the search engine. The search engine can also output the search results, the concept-values assigned to the search results, or the original concept-values submitted by the query, to an external electronic resource.

BRIEF DESCRIPTION OF THE FIGURES

FIG. 2 illustrates a prior art user query interface;

FIG. 3 illustrates a prior art markup tool;

FIG. 7 illustrates a search result page according to an embodiment of the present invention; and

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 5:
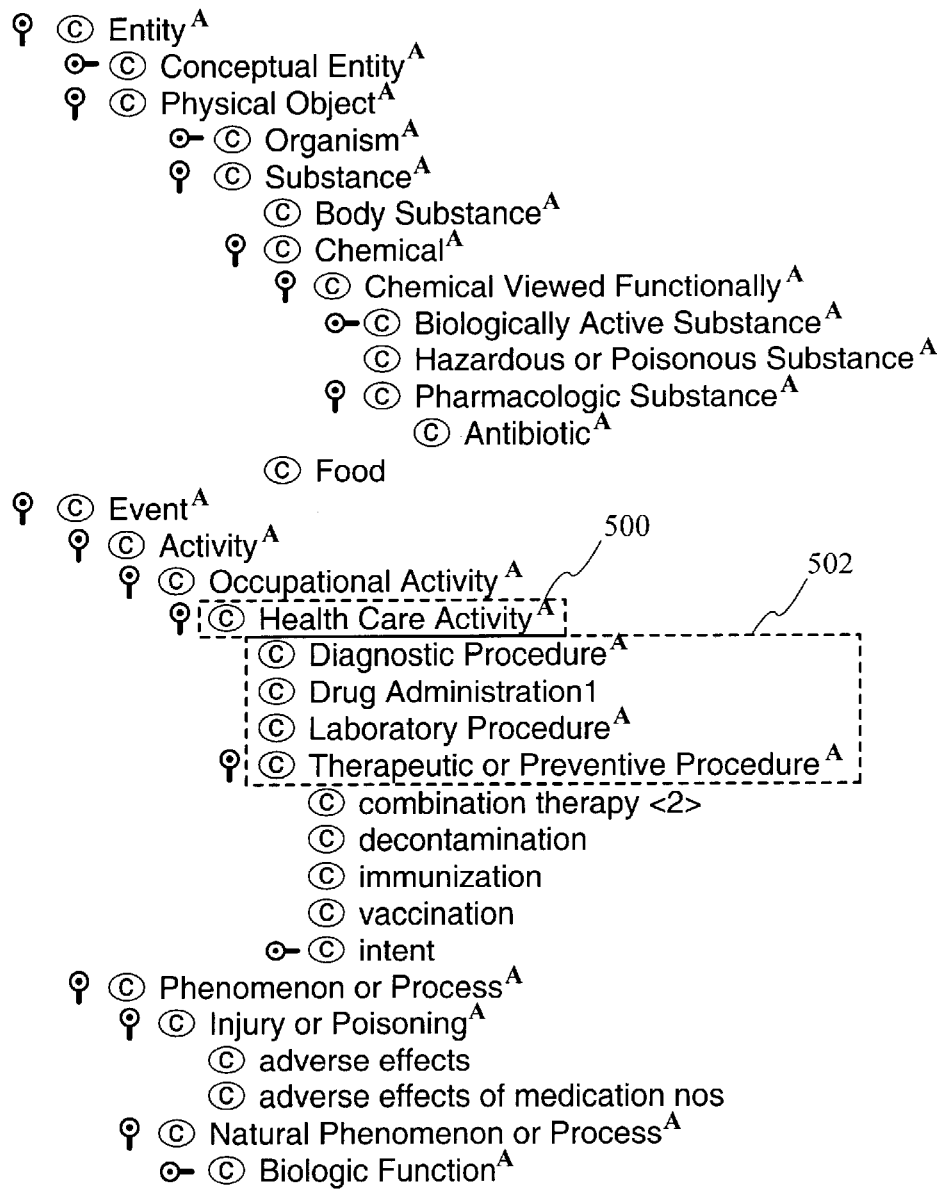
FIG. 5 illustrates a concept model tool according to an embodiment of the present invention.

FIG. 5 illustrates a concept model of the present invention. It is this concept model that drives the indexing system. The domain expert can modify the concepts in the concept model from within the concept model tool or from the markup tool. The concept model has two parts, concepts 500 and values 502. Concepts are variables that take on as their values one of the listed values for each concept. There are separate values 502 listed for each concept 500. Changes to the concept model will appear in the markup tool and the query model tool.

Figure 6:
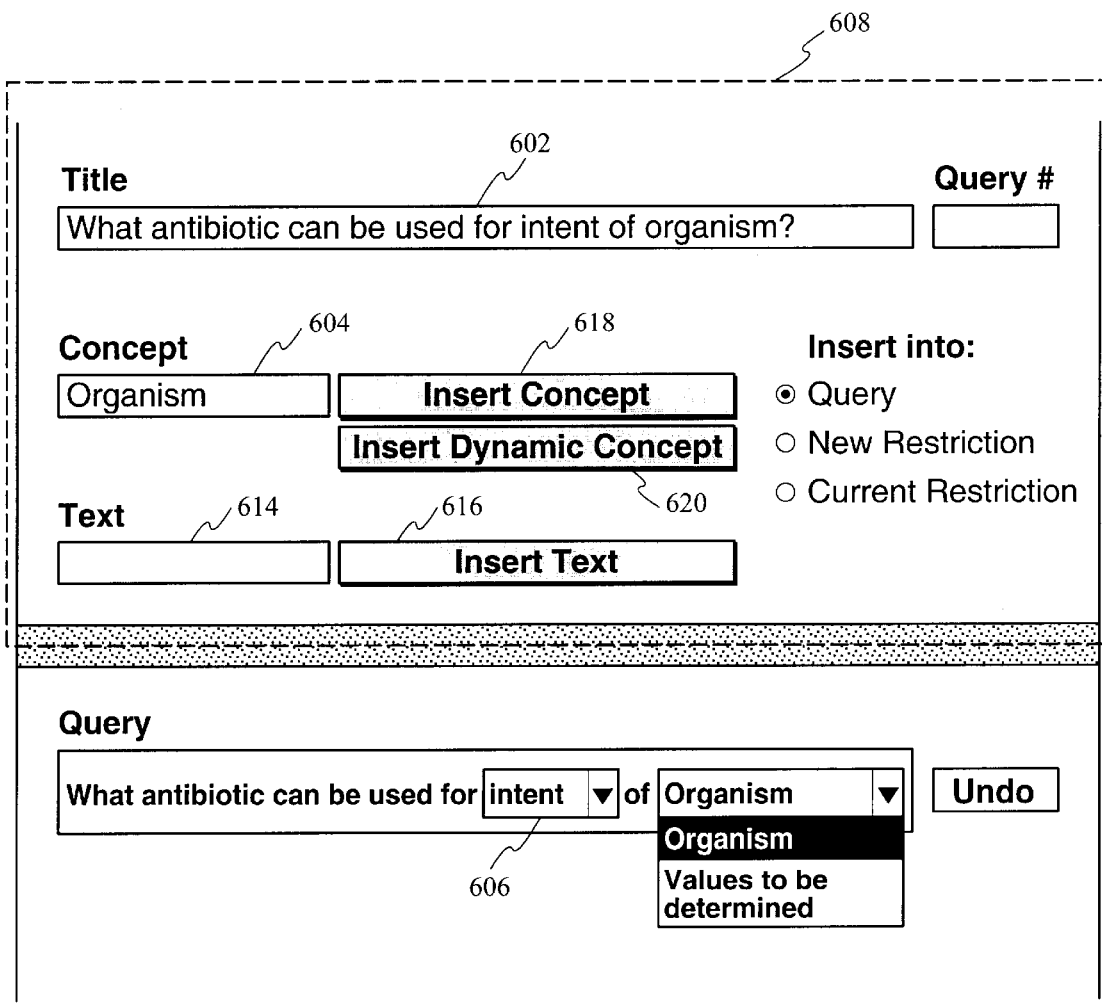
FIG. 6 illustrates a query model tool according to an embodiment of the present invention.

FIG. 6 illustrates the query model tool of the present invention. A query model is a structured set of queries created by the domain expert. Each query has one or more replaceable parameters that correspond one-to-one with concepts in the concept model. The current question in a query model is displayed in section 602. Each existing query is displayed with a button such as 604 that allows the domain expert to edit the query. Each query is also shown with one or more menus 606 which show the domain expert what the user-selectable values are. The domain expert can also add queries to the query model through section 608. The domain expert constructs the queries by typing in free text in boxes such as 614, and designating the text as "USE TEXT IN BOX" in 616. This indicates to the query model tool that the text in box 614 is actually "fixed" text, and is not user selectable from a menu. For the selectable text menus 606, the domain expert will choose one of the enumerated concepts displayed in the menus 620. The enumerated concepts in the menus can come from the concept model or from "dynamically-valued concepts". Dynamically-valued concepts are concepts that are found in the electronic text by comparing each word in the text to a semantic dictionary such as the UMLS knowledge base. In this way, queries integrate concept-values from the concept model. The domain expert continues to construct using the combination of fixed text and concepts in the menus until the query is complete. As such, each query becomes a template for many possible queries that are formed by the user as he chooses particular values for each concept in the template. The query model tool updates the allowable concepts in the menus dynamically when the domain expert modifies the set of concepts in the concept model.

The query model tool may be implemented with HTML forms, and controlled with Common Gateway Interface (CGI) scripts written in PERL or Java programming languages.

The query model tool will automatically generate the user query interface shown in FIG. 2.

The domain expert can develop the concept model and the query model concurrently because the two interfaces share relevant data in the concept model.

As an alternative embodiment of the present invention, the set of queries in the query model can be stored in the concept model thereby merging the query model and the concept model.

Figure 1:
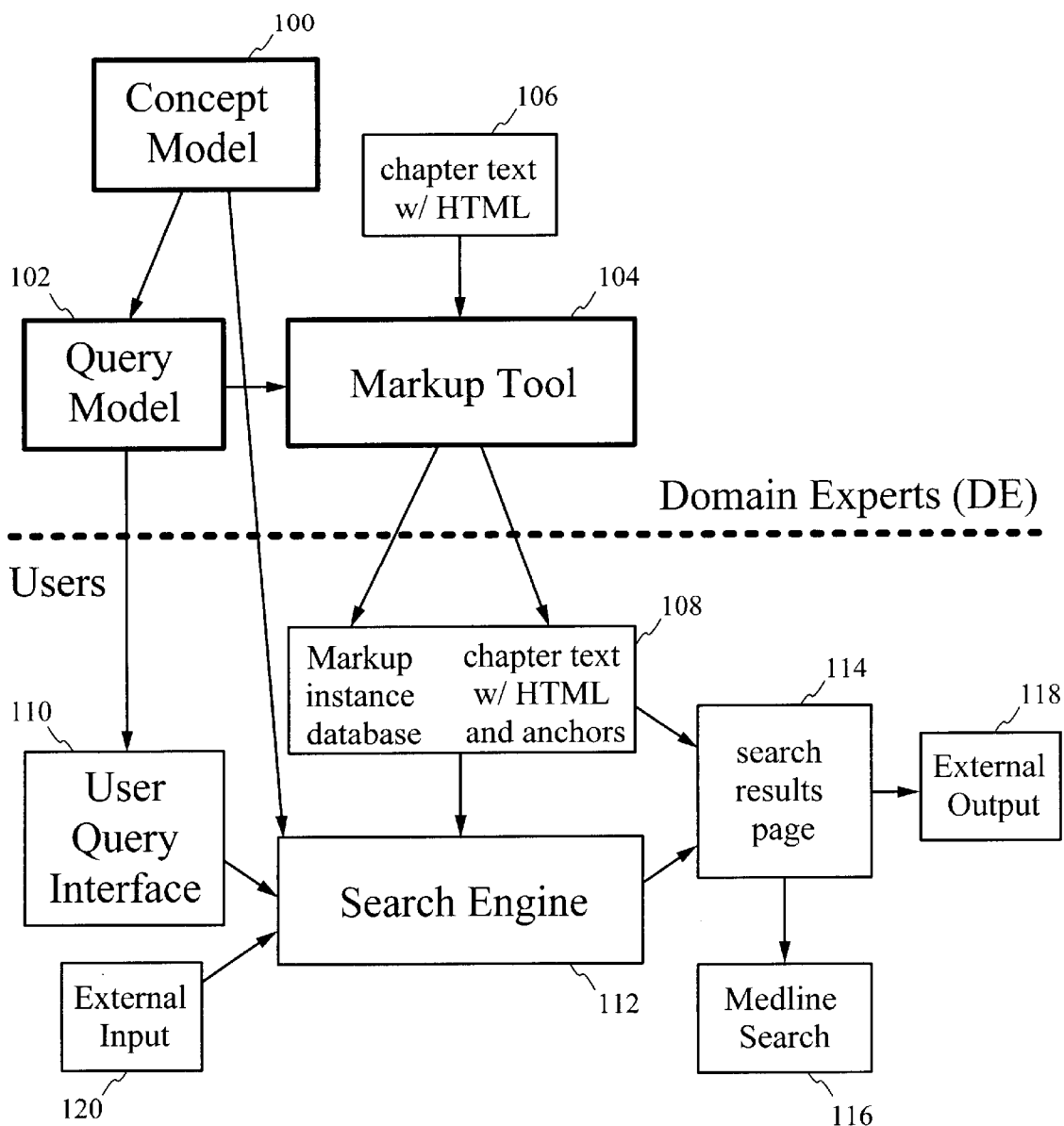
FIG. 1 illustrates a block diagram of an indexing system according to an embodiment of the present invention.

FIG. 1 is a block diagram illustrating the integration of the components of the system of the present invention. The concepts in the concept model 100 are made available to a query model tool, and at the same time, a function in the query model tool can add concept-values to the concept model. The domain expert uses a subset of the available concepts in the query model tool to generate a set of queries in the query model 102. The subset of concepts used in the query model 102 is used to generate a set of concept-values available to the domain expert for the assignment of markup tags to the electronic text in the markup tool 104. The integration of the concept model 100, the markup tool 104, and the query model 102 ensures that the queries in the query model 102 and the markup tags assigned by the markup tool 104 integrates the concepts and values from the concept model 100. This increases the ease of marking up an electronic text for the domain expert because he does not have to manually keep track of what all the available concepts and values are.

A piece of ordinary unmarked text 106 is presented to the domain expert for markup tag assignment using the markup tool 104. The completed marked up text is presented in 108.

The query model 102 automatically generates the user query interface 110, which is the first of three interfaces the user will interact with. The user query interface 112 presents the queries and restrictions that a user uses to formulate his query.

Once the user has formulated a query, the user query interface 110 submits the query to the search engine 112. The search engine 112 uses the concept-values submitted in the query to match against the assigned markup tags. The search engine is looking only through the assigned markup tags and not all of the text and therefore performs the search very quickly.

Instead of a user query interface 110, an external input 120 such as another computer program can submit a query to the search engine 112 for searching.

The search engine 112 returns the results in the search results page 114 which is the second interface the user interacts with while performing a search. The results are presented in the left hand frame of the page and the relevant sections of text for each result is displayed in the right hand frame.

The user also have the option to submit the query results to an external database such as Medline to perform a guided Medline Search 116.

FIG. 2 illustrates a user query interface that is currently in use. Users use this template 210 to formulate their queries that are submitted to the search engine. For each query 212 in the template, the users can choose allowable values from pull-down menus, such as 202. The user is limited to the selections that is available in the pull-down menus. The user can also restrict their queries 212 using options such as 204 and 206 shown in the lower portion of the template 210 so that the accuracy of the search may be increased. Once the user has formulated the query, the user will click on a button 208 at the bottom of the template that will cause the user query interface to submit the query to the search engine for searching.

Figure 3:
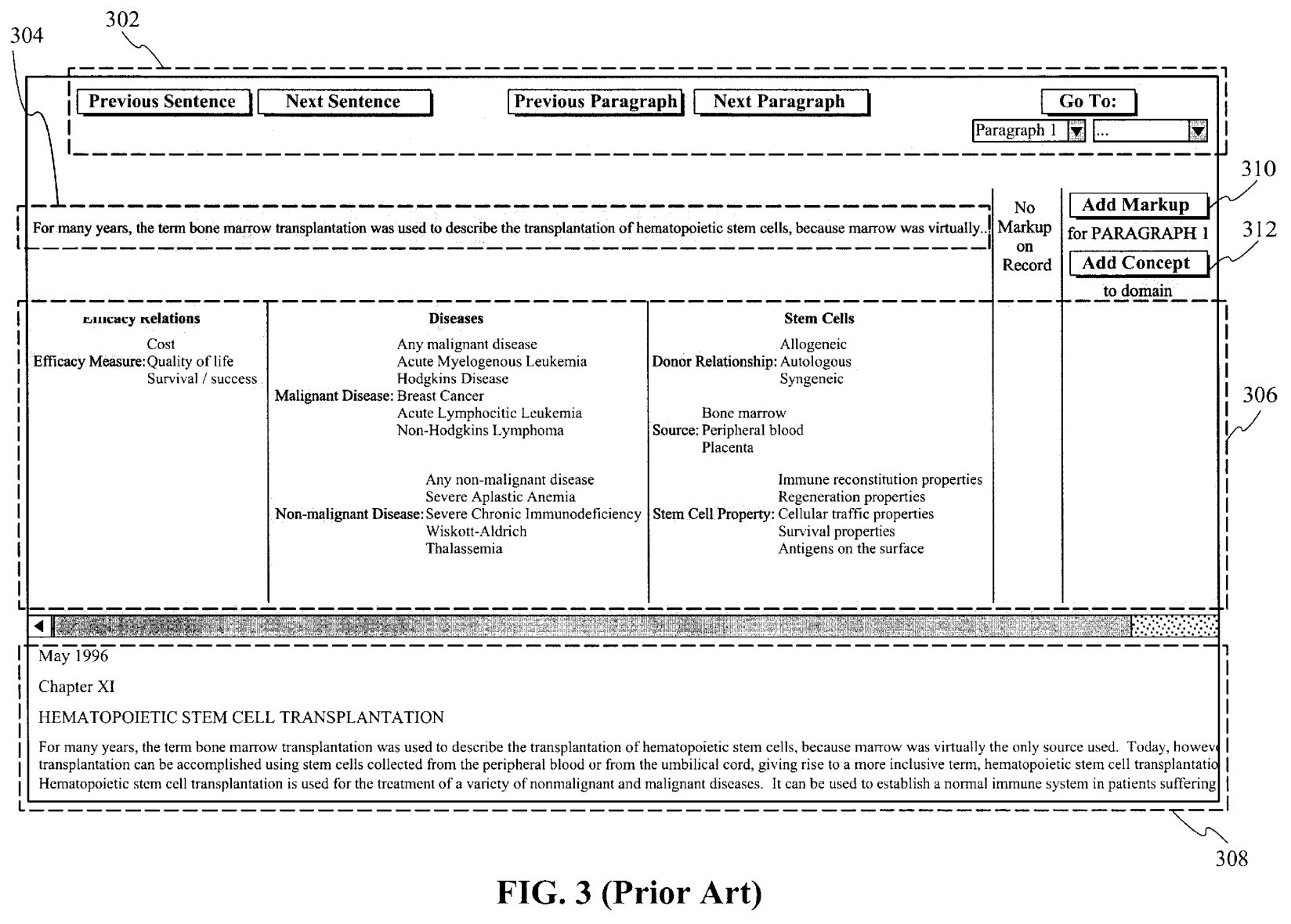

FIG. 3 illustrates the current markup tool used by a domain expert to markup a section of text so that a search engine can locate the section. Based on a set of concepts which the domain expert has developed in the concept model, the domain expert may go through the document line by line to markup the text. The upper portion 302 of the tool contains buttons for navigating through the text. The domain expert can move to the previous sentence, next sentence, previous paragraph, next paragraph, or jump directly to any other paragraph and sentence with the "Go To" button. The paragraph which contains the sentence 304 being marked up is displayed in section 308 at the bottom of the tool. The sentence 304 being marked up appears below the navigation buttons 302. The available concepts and values appears below the sentence 304 in the section 306. The domain expert chooses from the available values to markup the sentence 304. However, the domain expert has the ability to click the add button 312 to add concepts from within the markup tool so that he can introduce new concepts as he is going through the text. When the domain expert has chosen the correct mark up for the sentence 304, he will click on button 310 to insert the HTML mark up tags. In this markup tool, all the concepts-values that exists in the concept model are available to the domain expert for markup.

Figure 4:
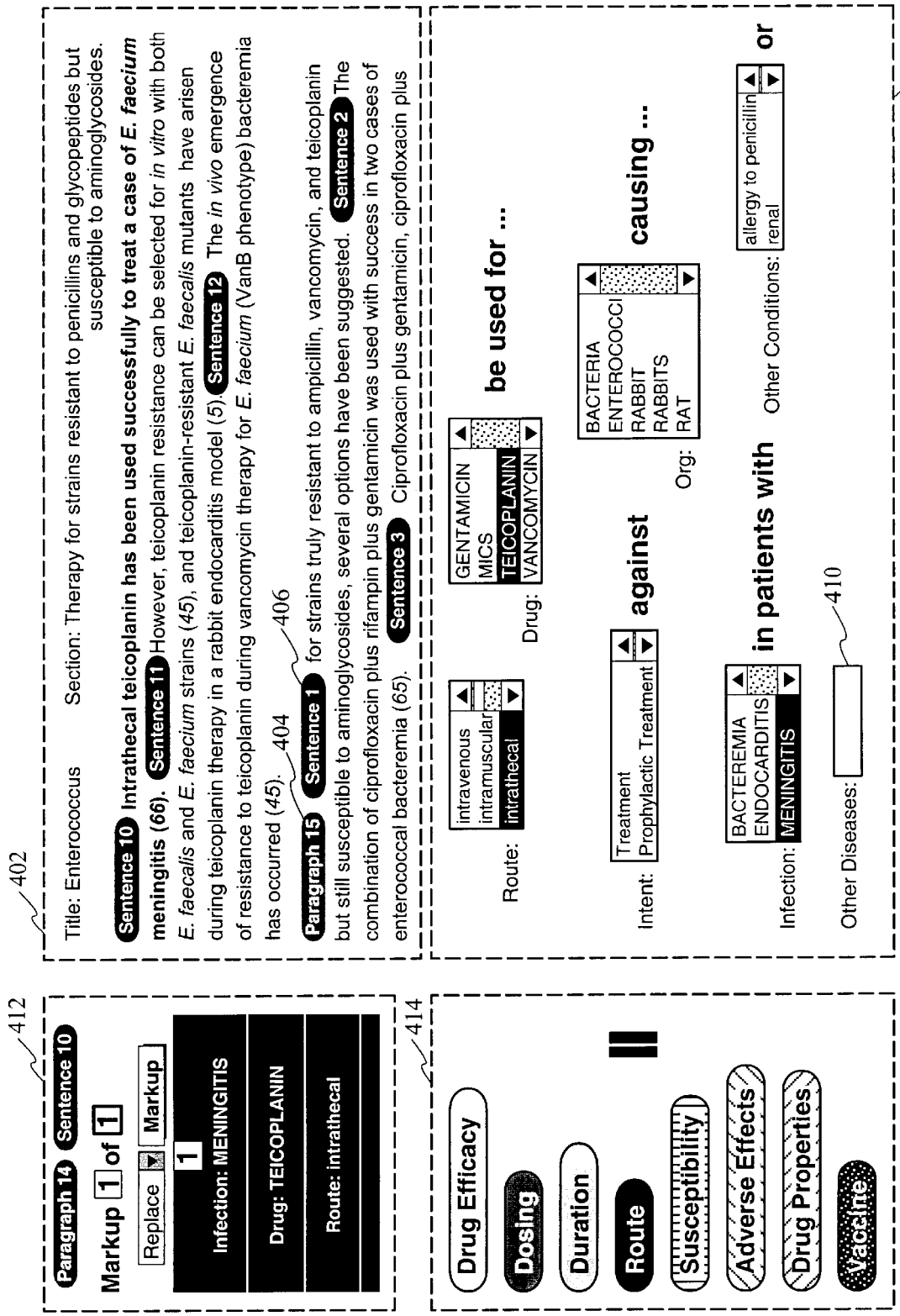
FIG. 4 illustrates a markup tool according to an embodiment of the present invention.

FIG. 4 illustrates the markup tool of the present invention. A paragraph 404 and sentence 406 being assigned markup tags is shown in section 402. The subset of concept-values that was used to create the set of queries in the query model is used by the markup tool to generate the set of allowable concepts and values presented in section 408. The domain expert has to choose from the list of allowable values to assign markup tags to the sentence. He also has the ability to add values from within the markup tool. This is done in box 410 where the domain expert can enter a new concept. Unlike the previous markup tool, not all the concept-values in the concept model is available to the domain expert in the markup tool. The domain expert has to first create a set of queries using the query model tool to determine what the subset of the concept-values will be, and can only assign markup tags using this subset of concept-values. This prevents the problem of the markup tool presenting a very long list of concepts-values encompassing all the concept-values in the concept model which would become unmanageable by the domain expert. The present assigned markup tag for a sentence 406, if any, is shown in section 412. The domain expert can add, replace, and delete assignments of markup tags to a sentence. A markup tag can also contain data that specify which query is associated with this assigned markup tag. The assigned markup tags can be stored directly in the electronic text or can be stored in record format in a markup instance database.

Section 414 is the areas that describes the categories of queries that are selected to perform the markup.

The markup tool can also suggest markup tags to the domain expert. For the markup proposal task, terms are defined as concepts from the concept model. A statistic analogous to inverse document frequency (idf) called iqtf, the inverse query term frequency is defined. Vectors are then defined as idf*iqtf multiplied by term frequency. For each text section, "document" vectors are created and an iteration of the calculation of a geometric closeness measure relative to a query vector is performed. The closest query vector is then selected as the query to propose to the domain expert for indexing that portion of text.

The markup tool may be implemented with HTML forms, and controlled with Common Gateway Interface (CGI) scripts written in PERL or Java programming languages.

FIG. 7 shows a typical results page that is returned by the search engine. The left hand frame 710 contains all the "hits" that the search engine has found. For each hit, a small excerpt 704 of the beginning of the relevant section of the document is displayed. The user has the choice to click on a link 702 to see the whole relevant section 708 of the document. The user also have the option to pass the search parameters to a guided Medline search by clicking on a button 706. The electronic text is shown in the right hand frame 712.

It will be clear to one skilled in the art that the above embodiment may be altered in many ways without departing from the scope of the invention. Accordingly, the scope of the invention should be determined by the following claims and their legal equivalents.

What is claimed is:

1. An integrated electronic text indexing and search system comprising:
   a concept model having concepts and values, wherein the concept model defines a set of concept-value pairs and wherein the concept model is modifiable by a domain expert;
   a query model characterized as a structured set of queries constructed by the domain expert in terms of a first subset of the set of concept-value pairs, wherein each of the queries has one or more replaceable parameters corresponding one-to-one to the concepts and each of the queries becomes a template for a number of possible user-formulated queries;
   a markup tool for generating a set of allowable concept-value pairs based on the first subset and for assigning the allowable concept-value pairs via markup tags to sentences or a piece of electronic text; and
   a query model tool for constructing the query model and for automatically generating a query interface for presenting restrictions and the set of queries that a user uses to formulate a query, wherein the user query interface is capable of submitting the user-formulated query to a search engine for matching concept-value pairs in the user-formulated query against the assigned markup tags.

2. The system as claimed in claim 1, wherein the search engine searches the assigned markup tags.

3. The system as claimed in claim 1, further comprising a concept model tool, wherein the domain expert modifies the concepts in the concept model from within the concept model tool or the markup tool and changes to the concept model appear in the markup tool and the query model tool.

4. The system as claimed in claim 1, wherein the domain expert constructs a query, via a query model tool, with a combination of fixed text and one of a plurality of enumerated concepts, and wherein the enumerated concepts come from the concepts in the concept model or dynamically-valued concepts found in the electronic text.

5. The system of claim 4, wherein the query model tool dynamically updates the allowable concept-value pairs when the domain expert modifies the concepts in the concept model or the dynamically-valued concepts.

6. The system as claimed in claim 4, wherein the dynamically-valued concepts are found by comparing each word in the electronic text to a semantic dictionary.

7. The system of claim 6, wherein the semantic dictionary is a UMLS knowledge base.

8. The system as claimed in claim 1, wherein the markup tool and the query model tool are controlled with Common Gateway Interface (CGI) scripts.

9. The system as claimed in claim 1, wherein the concept model and the query model are developed concurrently.

10. The system of claim 1, wherein the structured set of queries constructed by the domain expert are stored in the concept model, thereby merging the query model and the concept model.

11. The system of claim 1, further comprising a calculating means for calculating, for each section of the electronic text, a geometric closeness measure relative to a query vector, the markup tool then selects and suggests a closest query vector to the domain expert.

12. The system of claim 1, wherein the markup tool enables the domain expert to enter a new concept and add values for the new concept.

13. The system of claim 1, wherein the markup tool analyzes the electronic text and suggests markup tags to the domain expert, and wherein the assigned markup tags are stored directly in the electronic text or in record format in a markup instance database.

14. A method for integrating electronic indexing and searching, comprising a step of:
integrating a concept model, a query model, a query model tool, and a markup model tool so that queries constructed in the query model and markup tags assigned by the markup tool integrate concepts and values from the concept model, thereby increases ease of marking up a piece of electronic text for a domain expert, the integrating step further comprising the steps of:
defining, in the concept model, a set of concept-value pairs modifiable by the domain expert;
constructing, with the query model tool, the queries in terms of a first subset of the set of concept-value pairs;
generating, with the markup tool, allowable concept-value pairs based on the first subset;
assigning, via the markup tags, the allowable concept-value pairs to a portion of the electronic text;
presenting the queries and associated restrictions to a user and the user formulates at least one query;
submitting the at least one user-formulated query to a search engine; and
searching the assigned markup tags to find concept-value pairs that match the concept-values contained in the at least one user-formulated query.

15. The method as claimed in claim 14, further comprising a step of:
integrating a concept model tool such that the domain expert can modify the concepts from within the concept model tool or the markup tool, wherein resulting changes to the concept model appear in the markup tool and the query model tool.

16. The method as claimed in claim 14, wherein the constructing step further comprising a step of:
combining fixed text and one of a plurality of enumerated concepts, wherein the enumerated concepts come from the concepts in the concept model or dynamically-valued concepts found in the electronic text.

17. The method as claimed in claim 14, wherein the presenting step further comprising a step of:
automatically generating a user query interface for presenting the restrictions and the queries to the user.

18. The method as claimed in claim 17, wherein
the user query interface enables the user to formulate the at least one query based on the restrictions and the queries.

19. The method as claimed in claim 16, further comprising a step of:
dynamically updating the allowable concept-value pairs when the domain expert modifies the concepts in the concept model or the dynamically-valued concepts.

20. The method as claimed in claim 16, further comprising a step of:
comparing each word in the electronic text to a semantic dictionary to find the dynamically-valued concepts.

21. The method as claimed in claim 14, further comprising the steps of:
calculating, for each section of the electronic text, a geometric closeness measure relative to a query vector; and
selecting and suggesting a closest query vector to the domain expert.

22. The method as claimed in claim 14, further comprising a step of:
developing the concept model and the query model concurrently.

23. The method as claimed in claim 14, further comprising a step of:
merging the query model and the concept model by storing the queries in the concept model.

24. The method as claimed in claim 14, further comprising a step of:
integrating the markup tool with inputting means to allow the domain expert to enter a new concept and add corresponding values for the new concept.

25. The method as claimed in claim 14, further comprising a step of:
providing the markup tool an ability to suggest markup tags for assignment to the domain expert.

26. A computer readable medium accessible by a processor and carrying instructions executable by the processor for implementing method steps that integrate electronic indexing and searching, the instructions comprising:
computer program means for integrating a concept model, a query model, a query model tool, and a markup model tool so that queries constructed in the query model and markup tags assigned by the markup tool integrate concepts and values from the concept model, thereby increases ease of marking up a piece of electronic text for a domain expert, the computer program means further comprising:
program means for defining the concept model containing a set of concept-value pairs modifiable by the domain expert;

program means for constructing the query model containing the queries formed in terms of a first subset of the set of concept-value pairs;

program means for generating allowable concept-value pairs based on the first subset;

program means for assigning, via the markup tags, the allowable concept-value pairs to a portion of the electronic text;

program means for presenting the queries and associated restrictions to a user and for enabling the user to formulate at least one query;

program means for submitting the at least one user-formulated query to a search engine; and program means for searching the assigned markup tags to find concept-value pairs that match the concept-values contained in the at least one user-formulated query.

27. The computer readable medium as claimed in claim 26, further comprising:

program means for integrating a concept model tool such that the domain expert can modify the concepts from within the concept model tool or the markup tool, wherein resulting changes to the concept model appear in the markup tool and the query model tool.

28. The computer readable medium as claimed in claim 26, further comprising:

program means for combining fixed text and one of a plurality of enumerated concepts, wherein the enumerated concepts come from the concepts in the concept model or dynamically-valued concepts found in the electronic text.

29. The computer readable medium as claimed in claim 26, further comprising:

program means for automatically generating a user query interface for presenting the restrictions and the queries to the user.

30. The computer readable medium as claimed in claim 29, further comprising:

program means for enabling the user to formulate the at least one query based on the restrictions and the queries.

31. The computer readable medium as claimed in claim 28, further comprising:

program means for dynamically updating the allowable concept-value pairs when the domain expert modifies the concepts in the concept model or the dynamically-valued concepts.

32. The computer readable medium as claimed in claim 28, further comprising:

program means for comparing each word in the electronic text to a semantic dictionary to find the dynamically-valued concepts.

33. The computer readable medium as claimed in claim 26, further comprising:

program means for calculating, for each section of the electronic text, a geometric closeness measure relative to a query vector; and program means for selecting and suggesting a closest query vector to the domain expert.

34. The computer readable medium as claimed in claim 26, further comprising:

program means for enabling the domain expert to develop the concept model and the query model concurrently.

35. The computer readable medium as claimed in claim 26, further comprising:

program means for storing the queries in the concept model thereby merging the query model and the concept model.

36. The computer readable medium as claimed in claim 26, further comprising:

program means for allowing the domain expert to enter a new concept and add corresponding values for the new concept.

37. The computer readable medium as claimed in claim 26, further comprising:

program means for enabling the markup tool to suggest markup tags for assignment to the domain expert.

* * * * *